United States Patent
Byun

(10) Patent No.: US 10,697,718 B2
(45) Date of Patent: Jun. 30, 2020

(54) PRESSURE CAP FOR COOLING SYSTEM HAVING VARIABLE OPENING PRESSURE

(71) Applicant: Hyundai Motor Company, Seoul (KR)

(72) Inventor: Hyung-Suk Byun, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 57 days.

(21) Appl. No.: 15/370,942

(22) Filed: Dec. 6, 2016

(65) Prior Publication Data
US 2018/0073823 A1    Mar. 15, 2018

(30) Foreign Application Priority Data
Sep. 12, 2016 (KR) .................. 10-2016-0117238

(51) Int. Cl.
*F01P 11/02* (2006.01)
*F16K 24/00* (2006.01)
(Continued)

(52) U.S. Cl.
CPC ............... *F28F 27/00* (2013.01); *F01P 11/02* (2013.01); *F01P 11/0238* (2013.01); *F01P 11/0247* (2013.01); *F16K 24/00* (2013.01); *F16K 31/002* (2013.01); *F28D 15/00* (2013.01); *F28F 23/02* (2013.01); *G05D 23/08* (2013.01); *G05D 23/2754* (2013.01); *F01P 2070/02* (2013.01);
(Continued)

(58) Field of Classification Search
CPC ... F01P 2070/02; F01P 11/0247; G05D 23/08; G05D 23/2754; F16K 17/003; F16K 17/38; F16K 31/002; F03G 7/065
USPC .......................... 236/92 R; 60/527, 528, 529
See application file for complete search history.

(56) References Cited

U.S. PATENT DOCUMENTS 2,333,993 A * 11/1943 Frailing ................ F01P 3/2207
123/41.08
2,535,974 A * 12/1950 Watkins, Jr. ......... F01P 11/0238
236/92 C
(Continued)

FOREIGN PATENT DOCUMENTS

CA  2925847 A1 * 10/2016 ........... F16K 31/002
CA  2925847 A1 * 10/2016 ........... F16K 31/002
(Continued)

OTHER PUBLICATIONS

Review of progress in shape-memory polymers—LIU (Feb. 2007).*
Shape memory materials—Huang et al. (Jul.-Aug. 2010) (Year: 2010).*

*Primary Examiner* — Len Tran
*Assistant Examiner* — Jenna M Hopkins
(74) *Attorney, Agent, or Firm* — Morgan, Lewis & Bockius LLP

(57) ABSTRACT

A pressure cap structure for a cooling system having variable opening pressure, which is applied to a cooling system for circulating cooling water to radiate heat generated by an engine of a vehicle, and maintains the inside pressure of the cooling system in a predetermined range, the pressure cap may include a positive pressure spring mounted in a valve body, and operated to connect the cooling system to the outside when the pressure of the cooling system rises, and a shape memory member restored to the initial shape when reaching a predetermined temperature, and mounted between the positive pressure spring and a spring guard supporting the positive pressure spring.

5 Claims, 7 Drawing Sheets

(51) Int. Cl.

| | | |
|---|---|---|
| *F16K 31/00* | (2006.01) | |
| *F28D 15/00* | (2006.01) | |
| *F28D 21/00* | (2006.01) | |
| *F28F 23/02* | (2006.01) | |
| *F28F 27/00* | (2006.01) | |
| *G05D 23/08* | (2006.01) | |
| *G05D 23/275* | (2006.01) | |
| *F16K 17/38* | (2006.01) | |
| *F03G 7/06* | (2006.01) | |
| *F16K 17/00* | (2006.01) | |

(52) U.S. Cl.
CPC ............ *F03G 7/065* (2013.01); *F16K 17/003* (2013.01); *F16K 17/38* (2013.01); *F28D 2021/0094* (2013.01); *F28F 2255/04* (2013.01)

(56) References Cited

U.S. PATENT DOCUMENTS

| | | | | |
|---|---|---|---|---|
| 3,047,235 A | * | 7/1962 | Eshbaugh | F01P 11/0238 137/493.2 |
| 3,700,166 A | * | 10/1972 | Foults | F01P 7/16 123/41.54 |
| 4,036,433 A | * | 7/1977 | Wagner | G05D 23/185 137/625.26 |
| 4,136,795 A | * | 1/1979 | Crute | F01P 11/0238 220/203.26 |
| 4,167,159 A | * | 9/1979 | Warman | F01P 11/18 123/41.08 |
| 4,185,751 A | * | 1/1980 | Moore | F01P 11/0238 220/203.26 |
| 4,189,095 A | * | 2/1980 | Monigold | F01P 7/044 137/529 |
| 4,196,822 A | * | 4/1980 | Avrea | F01P 11/0238 220/203.06 |
| 4,227,646 A | * | 10/1980 | Hart | G05D 23/024 236/101 D |
| 4,241,845 A | * | 12/1980 | Daly | F01P 11/0238 220/203.26 |
| 4,417,689 A | * | 11/1983 | Sasaki | B05B 12/088 236/92 R |
| 4,458,840 A | * | 7/1984 | Hashimoto | F02P 5/103 236/101 C |
| 4,489,883 A | * | 12/1984 | Anderson | F01P 11/0238 220/201 |
| 4,498,599 A | * | 2/1985 | Avrea | F01P 11/0238 220/203.26 |
| 4,560,104 A | * | 12/1985 | Nagumo | F01P 7/167 236/34.5 |
| 4,580,719 A | * | 4/1986 | Long, Jr. | G05D 23/1333 236/101 B |
| 4,836,496 A | * | 6/1989 | Abujudom | F03G 7/065 251/11 |
| 4,865,249 A | * | 9/1989 | Sugano | F01P 11/18 236/92 C |
| 4,872,584 A | * | 10/1989 | Sakai | F01P 11/0247 220/201 |
| 4,883,225 A | * | 11/1989 | Kitchens | F01P 7/16 236/34.5 |
| 5,033,865 A | * | 7/1991 | Kuze | G05D 23/021 236/101 C |
| 5,381,952 A | * | 1/1995 | Duprez | F01P 11/16 236/34.5 |
| 5,509,269 A | * | 4/1996 | Kuze | G05D 23/02 60/527 |
| 6,276,312 B1 | * | 8/2001 | Summan | F01P 11/0247 123/41.54 |
| 6,321,995 B1 | * | 11/2001 | Badovick | F25B 41/062 236/92 B |
| 6,352,016 B1 | * | 3/2002 | Asbrand | B62D 5/061 137/468 |
| 6,360,957 B1 | * | 3/2002 | Harris | F01P 11/0238 236/101 D |
| 6,390,318 B1 | * | 5/2002 | Tanaka | F01P 11/0238 165/104.32 |
| 6,427,712 B1 | * | 8/2002 | Ashurst | E03B 7/10 137/2 |
| 6,540,762 B1 | * | 4/2003 | Bertling | A61B 5/15186 606/182 |
| 8,091,517 B2 | * | 1/2012 | Auweder | G05D 23/022 123/41.1 |
| 9,927,041 B2 | * | 3/2018 | Jackson, Jr. | F16K 31/002 |
| 2003/0024567 A1 | * | 2/2003 | Spriegel | F01P 11/0276 137/62 |
| 2003/0127413 A1 | * | 7/2003 | Spinelli | A47G 19/2272 215/11.4 |
| 2005/0211709 A1 | * | 9/2005 | Ramanathan | F01P 11/0247 220/303 |
| 2012/0025113 A1 | * | 2/2012 | Stadelbauer | F16K 31/002 251/11 |
| 2012/0091212 A1 | * | 4/2012 | Guilhamat | F01P 7/16 236/34.5 |
| 2016/0312911 A1 | * | 10/2016 | Holing | F16K 31/002 |
| 2018/0053961 A1 | * | 2/2018 | Song | H01M 2/04 |

FOREIGN PATENT DOCUMENTS

| | | | | |
|---|---|---|---|---|
| DE | 3045357 A1 | * | 6/1982 | ............. F01P 11/02 |
| DE | 3045357 A1 | * | 6/1982 | ............. F01P 11/02 |
| DE | 4422292 A1 | * | 12/1995 | .......... F01P 11/0247 |
| DE | 4422292 A1 | * | 12/1995 | .......... F01P 11/0247 |
| DE | 102007039109 A1 | * | 2/2009 | ............... F01P 3/08 |
| DE | 102007039109 A1 | * | 2/2009 | ............... F01P 3/08 |
| GB | 745250 A | * | 2/1956 | ........... F16K 17/003 |
| JP | H 08100654 A | | 4/1996 | |
| JP | 2006280766 A | * | 10/2006 | |
| KR | 10-2013-0065135 A | | 6/2013 | |
| KR | 20140105690 A | | 9/2014 | |
| WO | WO-0071872 A1 | * | 11/2000 | .......... F01P 11/0247 |

\* cited by examiner

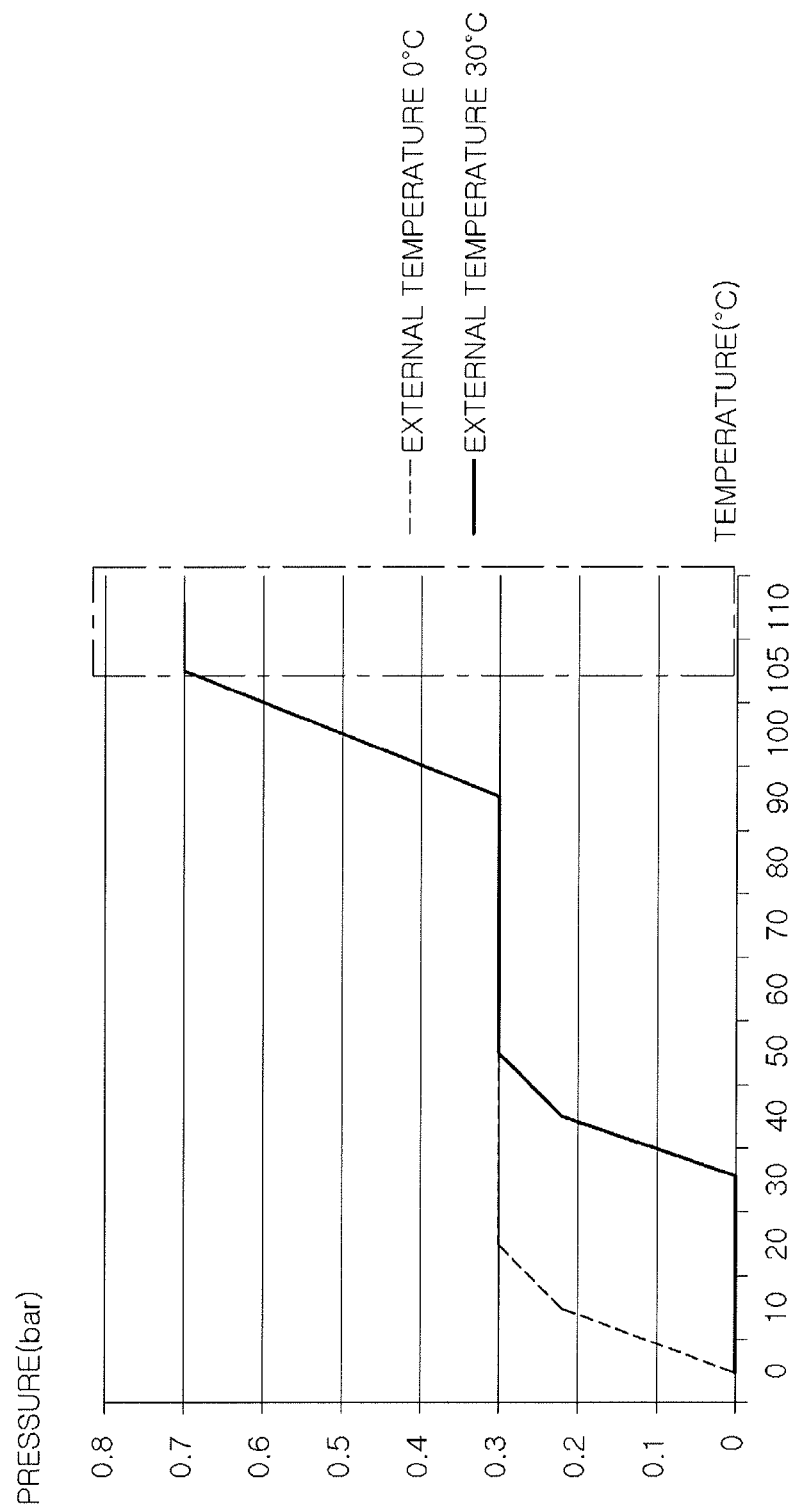

ized Description, which together serve to explain certain

PRESSURE CAP FOR COOLING SYSTEM HAVING VARIABLE OPENING PRESSURE

CROSS-REFERENCE TO RELATED APPLICATIONS

The present application claims priority to Korean Patent Application No. 2016-0117238, filed on Sep. 12, 2016, the entire contents of which is incorporated herein for all purposes by this reference.

BACKGROUND OF THE INVENTION

Field of the Invention

Exemplary embodiments of the present invention relate to a pressure cap for a cooling system which is applied to a cooling system of a vehicle and maintains a constant pressure, and more particularly, to a pressure cap for a cooling system having variable opening pressure, which is capable of maintaining opening pressure at low pressure under low temperature.

Description of Related Art

A vehicle includes a cooling system for circulating cooling water to radiate heat generated by operation of an engine. The cooling system is connected to the engine, a surge tank, a radiator and the like through a hose.

The cooling system includes a pressure cap illustrated in FIG. 1, in order to prevent the cooling water from being overheated and boiled.

The pressure cap includes a positive pressure spring 18 and a negative pressure spring 13 which are installed in a valve body 11 so as to face each other. When the pressure of the cooling system is high, the positive pressure spring 18 is operated to remove the internal pressure, and when the pressure of the cooling system is low, the negative pressure spring 13 is operated to maintain the internal pressure.

Since an engine installed in a commercial vehicle has a large displacement, the commercial vehicle requires a large amount of cooling water. Thus, when the temperature rises by 40° C. or more from the initial temperature, the inside of the cooling system reaches the system pressure. For example, when the outdoor temperature is 0° C., high pressure is applied to the cooling system at a cooling water temperature of 40° C. or more, and when the atmospheric temperature is 30° C., high pressure is applied to the cooling system at a cooling water temperature of 70° C. or more. Referring to FIG. 2, in the winter time (outdoor temperature of 0° C.), high pressure is applied to the cooling system in a region indicated by an alternate long and short dash line. In the summer time, high pressure is applied to the cooling system at a temperature of 70° C. or more. Since the pressure of the cooling system is maintained at a high-pressure condition of 0.7 bar even after the vehicle is operated, high pressure is continuously applied to the cooling system.

When the cooling system is maintained under high pressure for a long time, the durability of the surge tank, the radiator and the hose connecting them may be reduced. Since high pressure is applied for a long time, a water leak, burst or the like occurs to reduce the lifetime. Thus, the parts need to be frequently replaced.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a pressure cap for a cooling system having variable opening pressure, which compresses a positive pressure spring in advance through a shape memory member, maintains opening pressure at low pressure below the boiling point of cooling water, and maintains opening pressure at pressure corresponding to the related art only over the boiling point of the cooling water, thereby maintaining the overall pressure of the cooling system at low pressure.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an exemplary embodiment of the present invention, there is provided a pressure cap for a cooling system having variable opening pressure, which is applied to a cooling system for circulating cooling water to radiate heat generated by an engine of a vehicle, and maintains the inside pressure of the cooling system in a predetermined range. The pressure cap may include: a positive pressure spring mounted in a valve body, and operated to connect the cooling system to the outside when the pressure of the cooling system rises; and a shape memory member restored to the initial shape when reaching a predetermined temperature, and mounted between the positive pressure spring and a spring guard supporting the positive pressure spring.

The shape memory member may include shape memory polymer.

The shape memory member may be compressed when reaching a boiling temperature of the cooling water.

The shape memory member may be injection-molded in a state where a lower portion of the positive pressure spring is inserted.

The shape memory member may have a cover member mounted thereon to cover the shape memory member, and the cover member may be assembled into the spring guard.

One of the cover member and the spring guard may have assembly protrusions formed thereon, and the other may have assembly grooves formed therein.

The assembly protrusions may be formed at predetermined intervals along the circumference of the corresponding member, and the number of assembly grooves may be equal to the number of assembly protrusions.

The vehicle may include a commercial vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7 is a graph illustrating the inside pressure of a cooling system to which the pressure cap for a cooling system having variable opening pressure according to the present embodiment is applied.

Figure 1:
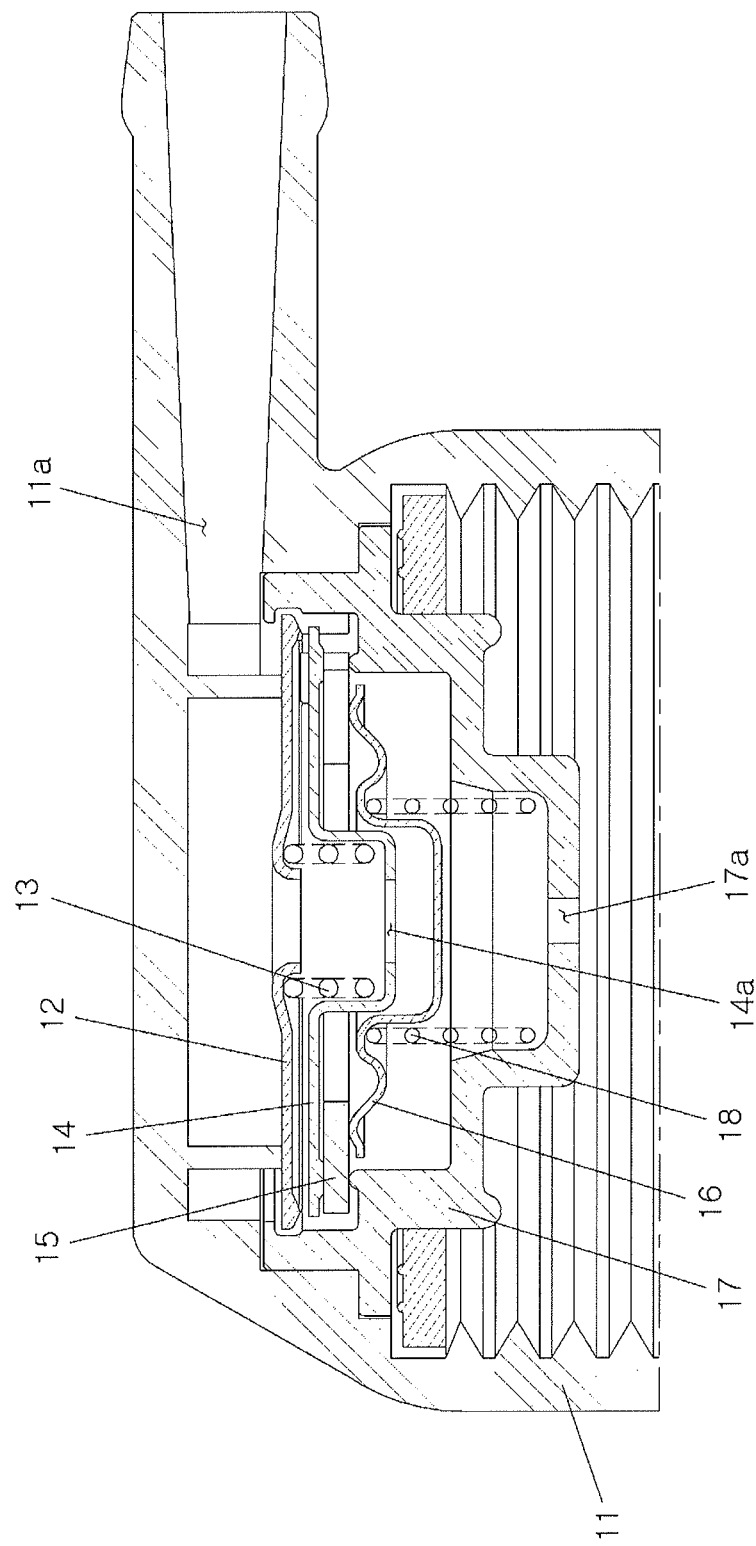
FIG. 1 is a cross-sectional view of a conventional pressure cap.
Figure 2:
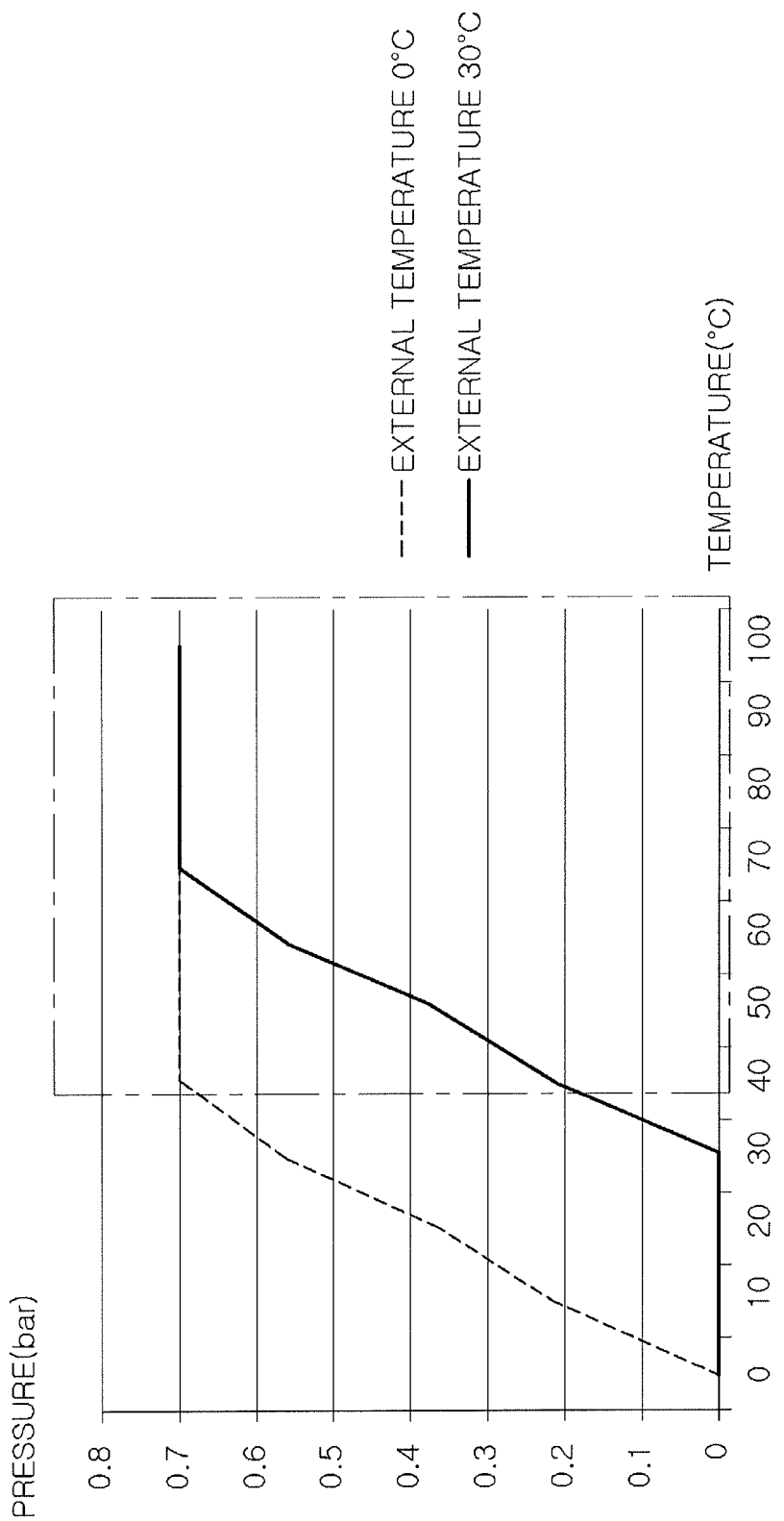
FIG. 2 is a graph illustrating the inside pressure of a cooling system to which the conventional pressure cap is applied.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereafter, a pressure cap for a cooling system having variable opening pressure according to an exemplary embodiment of the present invention will be described with reference to the accompanying drawings.

The pressure cap for a cooling system having variable opening pressure according to the exemplary embodiment of the present invention includes a positive pressure spring 18 and a shape memory member 21. The positive pressure spring 18 is operated to connect the cooling system to the outside, when the pressure of the cooling system rises. The shape memory member 21 is restored to the initial shape at a predetermined temperature, and mounted between the positive pressure spring 18 and a spring guard 17 for supporting the positive pressure spring 18.

The pressure cap for a cooling system having variable opening pressure according to the exemplary embodiment of the present invention may be applied to a commercial vehicle requiring a large amount of cooling water, and maintain the pressure of the cooling system at low pressure below the boiling point of the cooling water.

Figure 3:
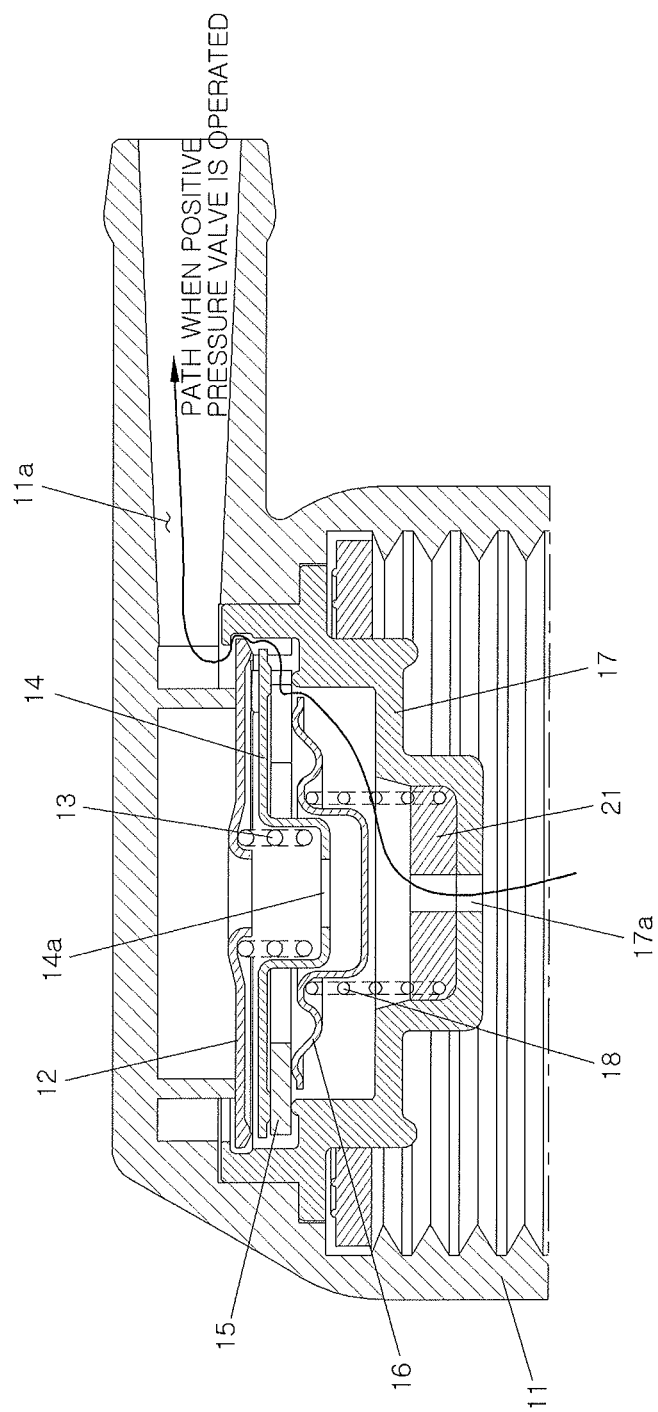
FIG. 3 is a cross-sectional view of a pressure cap for a cooling system having variable opening pressure an exemplary embodiment according to an exemplary embodiment of the present invention.

FIG. 3 is a cross-sectional view of the pressure cap.

A valve body 11 is mounted in a surge tank of the cooling system, includes other components therein, and has a port 11a formed at one side thereof, the port 11a serving as a path through which the surge tank fluidically-communicates with the outside.

An upper guard 12 is mounted in the valve body 11, and supports a negative pressure spring 13.

When the pressure of the cooling system is low, the port 11a is opened by the elastic force of the negative pressure spring 13.

A spring plate 14 is mounted at the lower end portion of the negative pressure spring 13. When the pressure of the cooling system is normal, the spring plate 14 is sealed by a gasket 15 interposed between the spring plate 14 and the valve body 11. The spring plate 14 has a communication hole 14a formed in the center thereof.

A retainer 16 is mounted under the gasket 15.

The upper end portion of the positive pressure spring 18 is supported by the retainer 16. When the inside pressure of the cooling system rises, the positive pressure spring 18 lifts the retainer 16 and the spring plate 14 such that the inside and the outside fluidically-communicate with each other.

A spring guard 17 is fastened to the valve body 11, and supports the bottom of the positive pressure spring 18. The spring guard 17 has a communication hole 17a formed therein, the communication hole 17a connecting the inside of the cooling system to the outside.

When the inside pressure of the cooling system rises, the positive pressure spring 18 of the pressure cap is expanded to lift the retainer 16 and the spring plate 14. Then, the inside pressure of the cooling system is removed through a gap between the circumference of the spring plate 14 and the inside surface of the valve body 11.

In the present embodiment, the shape memory member 21 is interposed between the lower end portion of the positive pressure spring 18 and the spring guard 17 supporting the lower end portion of the positive pressure spring 18, and partially compresses the positive pressure spring 18 in advance.

The shape memory member 21 is restored to the original shape when a predetermined temperature or condition is satisfied. In the present embodiment, shape memory polymer may be applied as the shape memory member 21.

The shape memory polymer is synthetic resin which is restored to the original state, when the shape memory polymer is heated to a predetermined temperature. The shape memory polymer connects polymer chains to each other at crosslink points, the polymer chains being smoothly changed based on a predetermined temperature set to the boundary, and remembers the changes in positional relation of the crosslink points by deformation as inside reaction thresholds. Then, when the shape memory polymer is softened with the rise of temperature, the shape memory polymer is restored to the original shape to remove the inside reaction thresholds.

The shape memory member 21 is extended or compressed based on the boiling point (approximately 105° C.) of the cooling water. The shape memory member 21 is extended when the cooling water temperature is equal to or lower than the boiling point, and compressed when the cooling water temperature is higher than the boiling point. Therefore, although the positive pressure spring 18 is compressed by the shape memory member 21 in advance, the positive pressure spring 18 is further compressed when the cooling temperature is equal to or lower than the boiling point. Thus, the operation pressure of the pressure cap is lowered.

Figure 4:
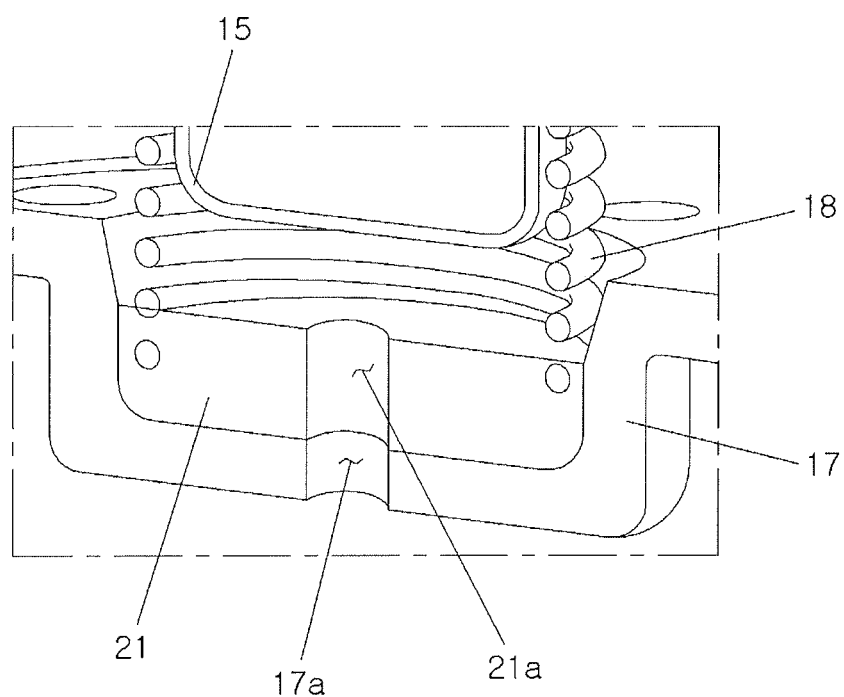
FIG. 4 is an expanded perspective view of a main portion of FIG. 3.
Figure 5:
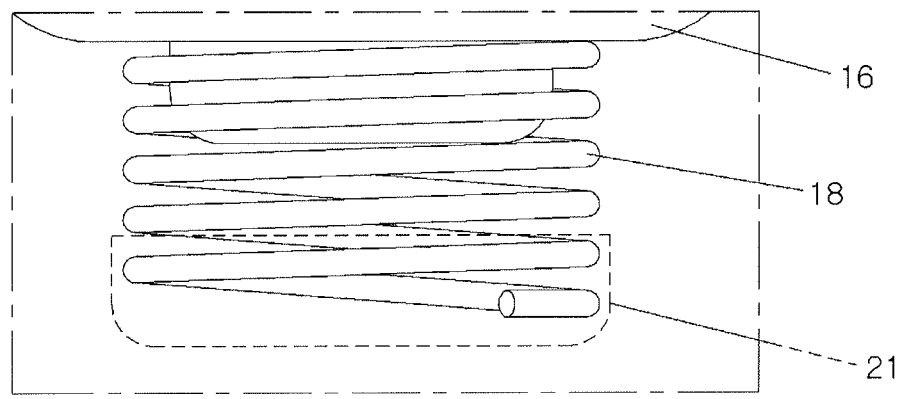
FIG. 5 is an expanded cross-sectional view of the main portion of FIG. 3.

As illustrated in FIG. 3 and FIG. 4, the lower portion of the positive pressure spring 18 is integrated with the shape memory member 21, that is, the shape memory polymer. For this structure, as the memory shape polymer is formed in a state where the lower portion of the positive pressure spring 18 is inserted, the lower portion of the positive pressure spring 18 is integrated with the shape memory polymer.

The shape memory member 21 may have a through-hole 21a formed at a position corresponding to the communication hole 17a formed in the spring guard 17, and the through-hole 21a may serve as a path through which pressure is removed.

The shape memory member 21 may be coupled to the spring guard 17 in such a form that the circumference thereof is forced into the spring guard 17.

Figure 6:
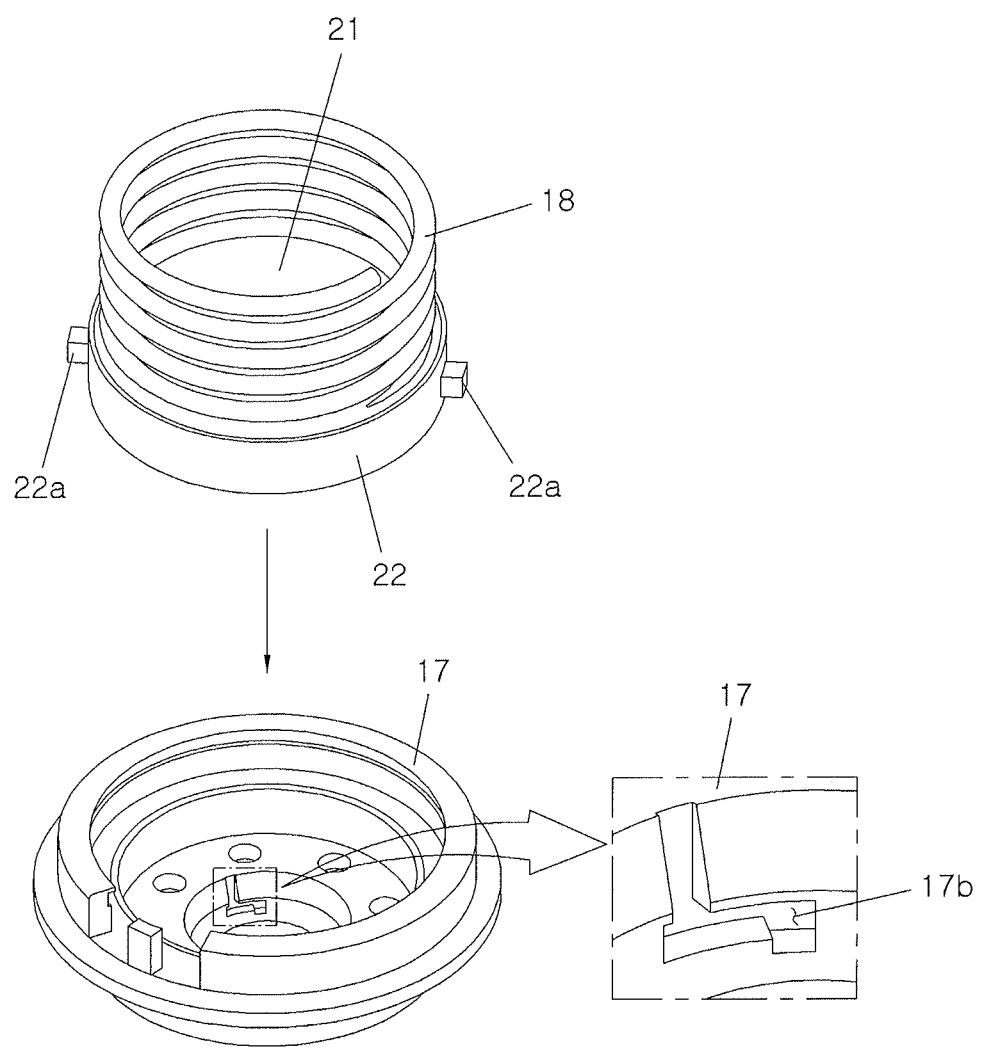
FIG. 6 is a perspective view illustrating a state in which a cover member is mounted on the outside of a shape-memory member in the pressure cap for a cooling system having variable opening pressure according to the exemplary embodiment of the present invention.

FIG. 6 illustrates another example in which the shape memory member 21 is coupled to the spring guard 17. The shape memory member 21 has a cover member 22 mounted thereon to house the shape memory member 21, and the cover member 22 is fastened to the spring guard 17.

The cover member 22 and the spring guard 17 may be fastened by a structure of assembly protrusions 22a and assembly grooves 17b. For example, as illustrated in FIG. 6, a plurality of assembly protrusions 22a are formed at predetermined intervals along the outer circumference of the cover member 22, and a plurality of assembly grooves 17b to which the assembly protrusions 22a are fastened are formed in the spring guard 17. The number of assembly protrusions 22a is equal to the number of assembly grooves 17b. As the assembly protrusions 22a are fastened to the assembly grooves 17b, the cover member 22 and the spring guard 17 may be fastened to each other.

The operation of the pressure cap for a cooling system having variable opening pressure according to the exemplary embodiment of the present invention will be described.

In the pressure cap for a cooling system having variable opening pressure according to the exemplary embodiment of the present invention, the positive pressure spring 18 is compressed by the shape memory member 21 in advance. since the shape memory member 21 is expanded below the boiling point of cooling water, the positive pressure spring 18 is further compressed.

Therefore, although the inside pressure of the cooling system is slightly raised by the positive pressure spring 18 and the shape memory member 21, the shape memory member 21 assists the elastic force of the positive pressure spring 18 to open the pressure cap. Referring to FIG. 7, the pressure of the cooling system may be maintained at a lower pressure (for example, 0.3 bar) than in the related art, around the boiling point both in the winter time (outdoor temperature of 0° C.) and in the summer time (outdoor temperature of 30° C.).

Furthermore, when the cooling water reaches the boiling point, the operation pressure of the pressure cape is maintained at high pressure, while the shape memory member 21 is restored (compressed) to the original shape.

Accordingly, since the pressure of the cooling system can be maintained at low pressure until the temperature of the cooling water reaches the boiling point, the durability of the surge tank, the radiator and the hose can be improved. Furthermore, since the replacement cycle is lengthened due to the improvement in durability of the parts, the time required for repair can be reduced while an operation loss is decreased.

In accordance with the exemplary embodiments of the present invention, since the positive pressure spring is compressed by the shape memory member in advance, the pressure of the cooling system may be maintained at low pressure even at low temperature.

Furthermore, when the cooling water temperature is higher than the boiling point, the opening pressure in the conventional pressure cap may be maintained to normally remove pressure in case where the cooling water reaches the boiling point.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pressure cap for a cooling system having variable opening pressure, which is applied to the cooling system for circulating cooling water to radiate heat generated by an engine of a vehicle, and maintains an inside pressure of the cooling system in a predetermined range, the pressure cap structure comprising:
   a positive pressure spring mounted in a valve body, and operated to connect the cooling system to an outside when the inside pressure of the cooling system rises; and
   a shape memory polymer restored to an initial shape thereof when reaching a predetermined temperature, and mounted between the positive pressure spring and a spring guard supporting the positive pressure spring,
   a cover member mounted to directly cover an end of the shape memory polymer, wherein the cover member is assembled into the spring guard,
   wherein the shape memory polymer is extended before reaching a boiling temperature of the cooling water and compressed from the initial shape of extension when reaching the boiling temperature of the cooling water, and
   wherein shape memory polymer is injection-molded in a state where a lower portion of the positive pressure spring is inserted into a body of the shape memory polymer.

2. The pressure cap structure of claim 1, wherein one of the cover member and the spring guard has assembly protrusions formed thereon, and another thereof has assembly grooves formed therein.

3. The pressure cap structure of claim 2, wherein the assembly protrusions are formed at predetermined intervals along a circumference of the cover member, and
   a number of the assembly grooves is equal to a number of the assembly protrusions.

4. The pressure cap structure of claim 1, wherein the vehicle includes a commercial vehicle.

5. The pressure cap structure of claim 1, wherein the end of the shape memory polymer which is directly covered by the cover member is mounted to be stationary.

\* \* \* \* \*